United States Patent
Gaa

(10) Patent No.: US 6,187,415 B1
(45) Date of Patent: Feb. 13, 2001

(54) SOLID SURFACING DIMENSIONAL LAMINATE, AND METHODS FOR MAKING AND USING SAME

(75) Inventor: Peter C. Gaa, Temple, TX (US)

(73) Assignee: Premark RWP Holdings, Inc., Wilmington, DE (US)

( * ) Notice: Under 35 U.S.C. 154(b), the term of this patent shall be extended for 0 days.

(21) Appl. No.: 09/161,265

(22) Filed: Sep. 26, 1998

(51) Int. Cl.⁷ .................. B32B 3/00; B32B 7/14
(52) U.S. Cl. ............... 428/203; 428/212; 428/913.3; 428/503; 428/211
(58) Field of Search .................... 428/212, 203, 428/156, 195, 913.3, 211, 503

(56) References Cited

U.S. PATENT DOCUMENTS

| | | | |
|---|---|---|---|
| 3,434,919 | * 3/1969 | Whitman | 162/123 |
| 3,798,111 | * 3/1974 | Lane et al. | 161/162 |
| 4,181,567 | * 1/1980 | Riddell et al. | 162/168 |
| 4,282,059 | * 8/1981 | Davidson | 162/158 |
| 4,409,280 | 10/1983 | Wiley et al. | 428/203 |
| 4,424,261 | * 1/1984 | Keeling et al. | 428/530 |
| 4,971,855 | * 11/1990 | Lex et al. | 428/206 |
| 5,047,282 | 9/1991 | Mier | 428/204 |
| 5,296,340 | 3/1994 | Tsukada et al. | 430/394 |

FOREIGN PATENT DOCUMENTS

| | | | |
|---|---|---|---|
| 0310350 | 4/1989 | (EP) | D21H/1/02 |
| 0616906 | 9/1994 | (EP) | B44C/5/04 |

OTHER PUBLICATIONS

Patent Abstract of Japan –08108510, Apr. 30, 1996.
Patent Abstract of Japan –07009650, Jan. 31, 1995.
Patent Abstract of Japan –5104695, Apr. 27, 1993.
Patent Abstract of Japan –5116250, May 14, 1993.
Australian Office Action.
European Search Results –EP 99 11 8091.

* cited by examiner

Primary Examiner—Bruce H. Hess
Assistant Examiner—B. Shewareged
(74) Attorney, Agent, or Firm—Fulbright & Jaworski L.L.P.

(57) ABSTRACT

Multilayered dimensional laminates with improved depth appearance are provided that include a plurality of decorative layers having the same or different patterns layered so that a portion of each pattern is visible in the final dimensional laminate. Such laminate may further include a backing or core. Methods for making and using the multilayered dimensional laminates are also provided.

16 Claims, No Drawings

1

SOLID SURFACING DIMENSIONAL LAMINATE, AND METHODS FOR MAKING AND USING SAME

BACKGROUND OF THE INVENTION

1. Field of the Invention

The present invention relates to decorative laminates, to lay-ups for such laminates, and to methods of making such laminates and lay-ups. In another aspect, the present invention relates to multi-layered decorative laminates having a patterned depth appearance, lay-ups for such multi-layered decorative laminates, and to methods of making such multi-layered decorative laminates and lay-ups. In even another aspect, the present invention relates to a multi-layered decorative laminate where each decorative layer has a pattern off-set one from the other or each layer has the same or different pattern so that when the multi-layers are assembled into a composite structure, the resulting overall pattern has an appearance of depth or appears three-dimensional.

2. Description of the Related Art

Decorative laminates or laminates prepared by heat and pressure consolidation have been produced commercially for a number of years, and have found widespread acceptance in the building and furniture industry as counter and table tops, bathroom and kitchen work surfaces, wall paneling, partitions and doors. Such decorative laminates can be described as containing a number of laminae that are consolidated to form a composite or unitary structure carrying a surface decoration which can range from something as simple as a solid color to something as complex as an embossed simulated wood grain finish.

More specifically, a decorative laminate generally comprises plural layers of synthetic resin impregnated paper sheets consolidated or bonded together into a unitary structure under heat and pressure. In normal practice, the decorative laminate assembly, from the bottom up, consists of a core of one or more sheets impregnated with phenolic resin, above which lies a decorative sheet impregnated with melamine resin.

The core or base member functions to impart rigidity to the laminate and usually comprises a solid substrate which may or may not be formed prior to the initial laminating step. Prior to stacking, the sheets of the core member are impregnated with a water alcohol solution of phenol and formaldehyde or a formaldehyde precursor, dried and partially cured in a hot air oven, and finally cut into sheets. Examples of such a base or core member include: (1) a plurality of sheets of 90 to 150 pound ream kraft paper impregnated throughout and bonded with a substantially completely cured phenolic resin which has been converted to the thermoset state during the initial laminating step; (2) a precured plastic laminate such as glass fiber-reinforced thermoset polyester resin laminates or the like; (3) a wood product such as hardboard, woodwaste or particle boards, plywood or the like; (4) a mineral base board such as cement-asbestos board, sheet rock, plaster board or the like; or (5) a combination of these substrates.

The decorative sheet generally functions to give an attractive appearance to the laminate, and also gives the panel its surface characteristics (i.e., resistance to chemical agents, to heat, to light, to shock and to abrasion). The decorative sheet typically is a high quality 50 to 125 ream weight, pigment filled, alpha cellulose paper that has been impregnated with a water-alcohol solution of melamine-formaldehyde resin, dried and partially cured, and finally cut into sheets. The decorative sheet, prior to impregnation with the resin, may be of a solid color or may comprise a decorative design or pattern, or a photo-gravure reproduction of natural materials, such as, wood marble, leather, etc.

The decorative laminate is generally obtained by placing the resin impregnated core and decorative sheets between steel plates and subjecting the laminate stack to temperatures ranging from about 150 20 F. to about 500 20 F. and pressures ranging from about 800 to about 1600 psi for a time sufficient to consolidate the laminate and cure the resins (generally about 25 minutes to an hour). This causes the resin in the paper sheets to flow, cure and consolidate the sheets into a composite or unitary laminated mass referred in the art as a decorative high-pressure laminate. More than one laminate can be formed at one time by inserting a plurality of assembled sheets in a stack with each assembly being separated by a release sheet which allows the individual laminates to be separated after consolidation.

Finally, the decorative laminates so formed are bonded to a reinforcing substrate, such as plywood, hardboard, asbestos board, particle board or the like.

One drawback to these high-pressure decorative laminates are that the decorative sheet has only surface depth. Thus, the pattern imparted to the laminate by the decorative layer can only convey an appearance of depth through a patterned rendition of depth on the surface of the decorative layer. However, this surface pattern does not convey that same visual impression as structures that have visual elements that actually occur at different depths of the material and are visible to the observer's eye such as the visual appearance of most naturally occurring rocks and similar product.

There is a need in the art for high-pressure decorative laminates that have layered decorative sheets that when consolidated together produce a decorative laminate with visible features of the pattern that occur in different layers of the laminate, not just at a single decorative sheet depth as is standard in the art.

There is even another need in the art for lay-ups useful for making such above described high-pressure decorative laminates that have layered decorative sheets.

There is still another need in the art for a method of making the above described lay-ups.

There is yet another need in the art for a method of making high-pressure decorative laminates that have layered decorative sheets that when consolidated together produce a decorative laminate with visible features of the pattern that occur in different layers of the laminate, not just at a single decorative sheet depth as is standard in the art.

These and other needs in the art will become apparent to those of skill in the art upon review of this specification, including its drawings and claims.

SUMMARY OF THE INVENTION

It is an object of the present invention to provide for high-pressure decorative laminates that have layered decorative sheets that when consolidated together produce a decorative laminate with visible features of the pattern that occur in different layers of the laminate, not just at a single decorative sheet depth as is standard in the art.

It is another object of the present invention to provide for lay-ups useful for making such above described high-pressure decorative laminates that have layered decorative sheets.

It is even another object of the present invention to provide for a method of making the above described lay-ups.

It is still another object of the present invention to provide for method of making high-pressure decorative laminates that have layered decorative sheets that when consolidated together produce a decorative laminate with visible features of the pattern that occur in different layers of the laminate, not just at a single decorative sheet depth as is standard in the art.

These and other objects of the present invention will become apparent to those of skill in the art upon review of this specification, including its drawings and claims.

According to one embodiment of the present invention, there is provided in pre-laminated form a lay-up, and in laminated form a decorative member, having two or more decorative layers with decorative patterns. The transparencies and orientation of the decorative layers allow for at least a portion of each decorative pattern to be visible through the top layer to give the laminate an appearance of depth. In a more specific embodiment of this embodiment, a separating sheet may be provided between one or more of the facing decorative sheets. In another more specific embodiment of this embodiment, the decorative member may be provided a backing or core member. In even a more specific embodiment of this embodiment, the core comprises a plurality of phenol-formaldehyde resin impregnated paper layers, and the decorative layers comprise melamine-formaldehyde resin impregnated paper.

According to another embodiment of the present invention, this is provided a method of making the above described lay-up and decorative member. The method generally includes forming the lay-up comprising a stack of at least two resin impregnated decorative layers having a decorative pattern. The transparencies and orientation of the decorative layers of the stack are such that upon consolidation with heat and pressure, at least a portion of each decorative pattern of each decorative layer will be visible through the top decorative layer to give the laminate an appearance of depth. The method further includes lamination of the lay-up by application of sufficient heat and pressure to the lay-up to and cure the resins and consolidate the lay-up into a decorative laminate.

According to even another embodiment of the present invention, there is provided in pre-laminated form a lay-up, and in laminated form a multilayered laminate, which generally includes a backing sheet or core upon which is disposed the above described decorative layers.

According to still another embodiment of the present invention, there is provided a method of making the above described lay-up or multilayered laminate. The method generally includes forming the lay-up comprising a stack of a core or backing upon which is disposed at least two resin impregnated decorative layers having a decorative pattern. The transparencies and orientation of the decorative layers of the stack are such that upon consolidation with heat and pressure, at least a portion of each decorative pattern of each decorative layer will be visible through the top decorative layer to give the laminate an appearance of depth. The method further includes lamination of the lay-up by application of sufficient heat and pressure to the lay-up to and cure the resins and consolidate the lay-up into a decorative laminate.

According to yet another embodiment of the present invention, there is provided in pre-laminated form a lay-up, and in laminated form a multilayered laminate. This lay-up or laminate generally includes a core, a stack of at least two decorative layers disposed on the core, and a separating layer interposed between at least two of the decorative layers. Each decorative layer comprises a decorative pattern, with the transparencies and orientation of the decorative layers of the stack sufficient to allow for at least a portion of each decorative pattern to be visible through the top layer to give the laminate an appearance of depth.

According even still another embodiment of the present invention, there is provided a method of making the above described lay-up and multilayered laminate. The method generally includes forming the lay-up comprising the core or backing sheet, the stack of at least two resin impregnated decorative layers disposed on the core, and separating layers disposed between facing decorative sheets. The transparencies and orientation of the layers of the stack are sufficient such that upon consolidation with heat and pressure at least a portion of each decorative pattern to be visible through the top layer to give the laminate an appearance of depth. The method further includes application of sufficient heat and pressure to the lay-up to and cure the resins and consolidate the lay-up into a decorative laminate.

DETAILED DESCRIPTION OF THE INVENTION

According to the present invention, decorative laminates can be prepared that have an enhanced appearance of pattern depth by providing a decorative member having overlaying layers of patterned decorative sheets so that each pattern or part thereof is visible through the top of the final consolidated laminate.

The decorative member of the present invention may be substituted for the decorative sheet of a high pressure decorative laminate. Thus, it would be expected that a laminate lay-up utilizing the decorative member of the present invention would generally include, from the bottom up, of a core of one or more sheets impregnated with phenolic resin, above which lies the inventive decorative member impregnated with melamine resin.

As with traditional decorative laminates, in the present invention, the core or base member functions to impart rigidity to the laminate and usually comprises a solid substrate which may or may not be formed prior to the initial laminating step. Prior to stacking, the sheets of the core member are impregnated with a water alcohol solution of phenol and formaldehyde or a formaldehyde precursor, dried and partially cured in a hot air oven, and finally cut into sheets. Non-limiting examples of such a base or core member include: (1) a plurality of sheets of 90 to 150 pound ream kraft paper impregnated throughout and bonded with a substantially completely cured phenolic resin which has been converted to the thermoset state during the initial laminating step; (2) a precured plastic laminate such as glass fiber-reinforced thermoset polyester resin laminates or the like; (3) a wood product such as hardboard, woodwaste or particle boards, plywood or the like; (4) a mineral base board such as cement-asbestos board, sheet rock, plaster board or the like; or (5) a combination of these substrates.

The decorative sheets of the inventive decorative member of the present invention can be separated by optional separator sheets having variable transparency or the decorative sheets themselves can have variable transparency so that differing amount of each pattern will be visible through the top of the laminate upon final consolidation or curing. In this manner, a laminate can be constructed that improves the overall appearance of depth because the overall or resulting pattern is a combination of patterns occurring at different depths of the laminate structure, where the visibility of the deeper patterns can be augmented by changing the transparency of the structure between the deeper patterns and the surface of the laminate.

The optional separator sheet may be interposed between any two abutting decorative sheets as necessary to provide the final desired look. It should be understood that more than one separator sheet may be disposed between any two abutting decorative sheets. It should be understood that one or more separator sheets may be optionally provided between none, some or all of the abutting decorative sheets. It should also be understood that where two or more optional separator sheets are utilized, they may have the same or different transparency as necessary to achieve the final desired look.

According to the present invention, the decorative laminate sheet lay-up includes several layers of thermosetting resin impregnated core stock (preferably kraft paper) supporting a thermosetting resin impregnated decorative member of the present invention, which may be further overlaid with a thermosetting resin impregnated overlay sheet.

In the practice of the present invention, it is believed that any of the known thermosetting resins employed in making decorative laminates may be utilized. As a non-limiting example, preferably a phenol formaldehyde resin is utilized for the core stock, and preferably a clear melamine formaldehyde resin for the decorative and overlay sheets. The inventive decorative member or overlay sheets or layers can also be textured during consolidation. Generally, several laminates are made at a time with a release sheet interposed therebetween for easy separation after consolidation.

The prior art methods utilized to laminate a core and decorative sheet are believed to be suitable for laminating the present invention decorative member and core sheets. In such a method, a decorative laminate is generally obtained by placing the lay-up comprising the resin impregnated core and decorative member between steel plates and subjecting the lay-up to temperatures ranging from about 150° F. to about 50020 F. and pressures ranging from about 800 to about 1600 psi for a time sufficient to consolidate the laminate and cure the resins (generally about 25 minutes to an hour). This causes the resin in the paper sheets to flow, cure and consolidate the sheets into a composite or unitary laminated mass referred in the art as a decorative high-pressure laminate.

In the practice of the present invention, the inventive dimensional solid surface laminates are obtained by orienting the multiple decorative layers and variable transparency layers in such a way that the resulting overall decorate appearance has an enhanced and actual depth aspect to the pattern. Additionally, the plurality of decorative layers could be dyed so that not only will the resulting pattern have depth; it will also have color depth (different colors or shades at different depths in the layered structure).

One preferred embodiment of the laminates of the present invention is to layer, on top of the core, a plurality of patterned decorative layers where the layers are laid-up such that each pattern is off-set one from another making each pattern visible through the top decorative layer or overlay sheet of the formed laminate. As a non-limiting example, suppose that each pattern is a wood grain pattern, then during lay-up each wood grain pattern would be arranged so that the patterns do not substantially overlap, i.e., the patterns are offset in the xy plane one from the other. In such a construction, the resulting overall appearance will be one of a depth wood grain instead of a surface graining appearance. As another non-limiting example, each pattern could be a marble pattern laid-up so that each individual pattern would be visible after consolidation, giving the surface laminate an improved look relative to actual marble or the synthetic marble solid surface compositions.

The decorative laminates of the present invention can also include separating layers interposed between all or some of the decorative layers of the decorative member. These separating layers are designed to have the same or different transparency or opacity indexes so that each decorative pattern can be visually augmented by the separating layer. Thus, if one desired a dimensional laminate with a translucent sub-pattern or patterns therein, one would use translucent separating layers between the top decorative layers and the sub-decorative layers.

Using variable pattern intensities and variable transparency separating layers, one can obtain any desired dimensional appearance one desires from the appearance of very deep graining or marbling to the appearance of ghost or phantom patterns barely visible through the principle or dominant pattern of the top most decorative layers.

In the practice of the present invention, there may be utilized, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A multilayered laminate comprising:
   A. a stack of at least two decorative layers, wherein each layer comprises a decorative pattern, wherein one of said at least two decorative layers comprises a top decorative layer of the stack, and wherein the transparencies and orientation of the decorative layers of the stack allow for at least a portion of each decorative pattern to be visible through the top layer to give the laminate an appearance of depth;
   B. a core upon which the stack is disposed;
   wherein the core comprises a plurality of phenolformaldehyde resin impregnated paper layers, and wherein the decorative layers comprise melamine-formaldehyde resin impregnated paper.

2. The laminate of claim 1, wherein each decorative layer has the same or different pattern.

3. The laminate of claim 1, further including a separating layer interposed between decorative layers of the stack.

4. The laminate of claim 1, wherein the separating layer is translucent.

5. A multilayered laminate comprising:
   A. a core; and
   B. a stack of at least two decorative layers disposed on the core, wherein each layer comprises a decorative pattern, wherein one of said at least two decorative layers comprises a top decorative layer of the stack, and wherein the transparencies and orientation of the decorative layers of the stack allow for at least a portion of each decorative pattern to be visible through the top layer to give the laminate an appearance of depth wherein the core comprises a plurality of phenolformaldehyde resin impregnated paper layers.

6. The laminate of claim 5, wherein each decorative layer has the same or different pattern.

7. The laminate of claim 5, further including a separating layer interposed between decorative layers of the stack.

8. The laminate of claim 7, wherein the separating layer is translucent.

9. The laminate of claim 5, wherein the decorative layers comprise melamine-formaldehyde resin impregnated paper.

10. A multilayered laminate comprising:
   A. a core;
   B. a stack of at least two decorative layers disposed on the core, wherein each layer comprises a decorative pattern, and wherein one of said at least two decorative layers comprises a top decorative layer of the stack; and wherein the transparencies and orientation of the decorative layers of the stack allow for at least a portion of each decorative pattern to be visible through the top layer to give the laminate an appearance of depth; and
   C. a separating layer interposed between at least two of the decorative layers, wherein said multilayered laminate is a high pressure decorative laminate;
   wherein the core comprises a plurality of phenolformaldehyde resin impregnated paper layers, and wherein at least one of the decorative layers comprise melamine-formaldehyde resin impregnated paper.

11. The laminate of claim 10, wherein each decorative layer has the same or different pattern.

12. The laminate of claim 11, wherein the separating layer is translucent.

13. A multilayered laminate comprising:
   a first decorative layer comprising a decorative pattern, wherein said first decorative layer comprises a thermoset resin impregnated paper; and
   a second decorative layer comprising a decorative pattern, wherein said second decorative layer is positioned adjacent said first decorative layer, and wherein the transparencies and orientation of said first decorative layer and said second decorative layer allow for at least a portion of said decorative pattern on said second decorative layer to be visible through said first decorative layer to give the laminate an appearance of depth.

14. The laminate of claim 13, further comprising:
   a core, wherein said second decorative layer is located between said first decorative layer and said core, and wherein said core comprises a plurality of phenol-formaldehyde resin impregnated paper layers.

15. The laminate of claim 13, wherein said thermoset resin comprises melamine formaldehyde resin.

16. A laminate comprising:
   a stack of at least two decorative layers, wherein each layer comprises a decorative pattern, wherein one of said at least two decorative layers comprises a top decorative layer of the stack, wherein the transparencies and orientation of the decorative layers of the stack allow for at least a portion of each decorative pattern to be visible through the top layer to give the laminate an appearance of depth, and wherein at least one of said at least two decorative layers comprises a thermoset resin impregnated paper.

* * * * *